Patented Sept. 19, 1944

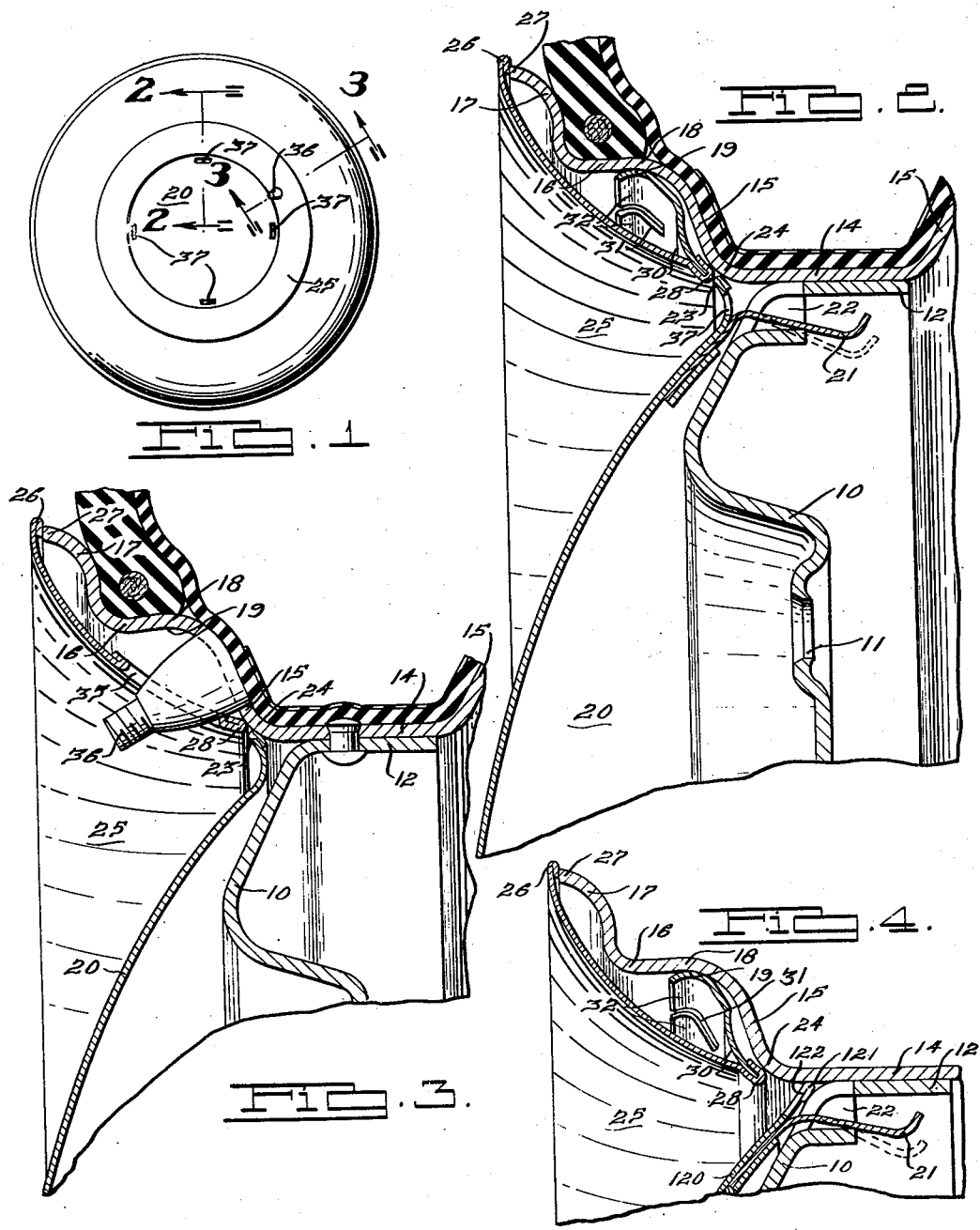

2,358,468

UNITED STATES PATENT OFFICE 2,358,468

SNAP-ON HUB CAP

William A. Mulhern, Detroit, Mich., assignor to Chrysler Corporation, Highland Park, Mich., a corporation of Delaware Application September 18, 1942, Serial No. 458,819

4 Claims. (Cl. 301—37)

My present invention relates to vehicle wheels.

The principal object of the present invention is to provide means whereby a smoothly finished exterior is provided for a wheel of the safety rim type comprising a drop center tire well, offset tire bead receiving portions and safety ridges struck upwardly at the inner edges of the offset tire bead receiving portions and forming slightly reentrant depressions at the inner edges of the outer surfaces of the bottom walls of the tire bead receiving offsets. An object of the present invention is to provide a trim piece for such a vehicle wheel which might be so finished as to present the appearance of a white side wall tire extending from a smoothly contoured hub of relatively small diameter.

A further object of the present invention is to provide a trim piece in an assembly of the foregoing type which will aid in prevention of accidental displacement and loss of the ornamental hub cover.

A further object of the present invention is to provide a hub cover which may be resiliently snapped into place on a wheel provided with chain grip receiving openings through the peripheries of the disc of the wheel, and a trim piece for the rim of the wheel which will aid in maintaining the hub cover in position without interfering with the functioning of the chain grip receiving openings.

A further object of the present invention is to provide a trim piece for the rim of a vehicle wheel of the foregoing type which may be conveniently associated with and disassociated from a wheel, and which may be readily manufactured with but few simple operations.

The objects and advantages of the present invention will be more readily understood from an inspection of the following specification taken in connection with the accompanying drawing wherein like numerals refer to like parts throughout.

In the drawing, Fig. 1 is a side elevation of the outer surface of a wheel assembly having a tire and the present invention applied thereto;

Fig. 2 is a partial section on an enlarged scale taken along line 2—2 of Fig. 1;

Fig. 3 is a similar partial section on an enlarged scale taken along line 3—3 of Fig. 1; and Fig. 4 is a view similar to Fig. 2 showing a modification of the present invention.

The present invention is adapted to be applied to a wheel including a demountable disc portion 10 provided with openings 11 by means of which the disc may be removably attached to a hub of the driving mechanism. The peripheral flange 12 of the disc wheel is attached to the bottom wall 14 of a rim including a drop center tire well formed by the bottom wall 14 and side walls 15, and offset tire bead receiving portions including bottom walls 16 and outwardly flared flanges 17. A slight safety ridge 18 is provided at each of the angles formed by the walls 15 and 16 by forcing the metal of the rim upward, the displacement of the metal forming slightly reentrant depressions 19 on the outer surface of the rim. When the usual tire and tube is assembled in the rim as shown, the safety ridges prevent accidental displacement of the tire beads so that serious accidents after blowouts are often prevented from happening.

In accordance with usual practice the assembly is provided with an ornamental, inwardly dished hub cover 20 which is provided for the purpose of presenting a smooth outward contour. A preferred manner of attaching such a hub cover is to provide a plurality of resilient clips 21 adapted to be forced through the usual chain grip openings 22 provided adjacent the periphery of the disc wheel.

In the preferred embodiment of my invention the outer edge of the hub cover 20 is provided with a bead 23, which bead is of such diameter as to rest against the shoulder 24 at the junction of the bottom wall 14 and side wall 15 of the drop center tire well of the rim. When the resilient clips 21 are forced through the openings 22, they are displaced under stress from their normal position as shown in dotted outline to their position of application as shown in full outline, the clips thus serving to press the bead 23 against the shoulder 24.

In order to continue the pleasing visual effect of smooth contours the assembly is provided with an outwardly flared rim covering collar 25 which may be painted to match the body trim or to present the appearance of a white side wall tire of great depth attached to a hub of relatively small diameter. In accordance with my invention the outer edge of the collar 25 is provided with a bead 26 adapted to rest against and extend upwardly beyond edge 27 of the outwardly flared portion 17 of the rim. The inner edge of the collar 25 is bent over to provide a bead 28 adapted to rest against the shoulder 24. The inner edge of a locking ring 30 is clamped in the angle of the bead 28, the ring extending upwardly from the inner edge of the collar 25 to contact the bottom wall 16 of the offset portion of the rim. The locking collar 30 is deeply slit as at 31 to provide a plurality of resilient tongues 32 having their free ends bent downwardly to present rounded surfaces adapted to be engaged in the depression 19. The distance between the inner edge of the collar 25 and the rounded edges of the tongues 32 is such as to cause springing of the tongues 32 when the collar 25 is forced inwardly and some slight springing of the collar itself, thus causing the tongues to snap into the depressions 19 under compressive strains and force the beads 26 and 28 firmly against the adjacent portions of the rim. In the preferred embodiment of the invention as shown in Figs. 2 and 3 the greatest diameter of the hub cover 20 is greater than the inner diameter of the collar 25 as defined by the bend of the bead 28, and the bead 28 is adapted to overlie and press against the bead 23 of the hub cover 20, so that the collar 25 aids the clips 21 in holding the hub cover against rattling, and also prevents accidental displacement and loss of the hub cover.

As shown in Fig. 3 the collar 25 is provided with a beaded opening 35 through which the valve stem 36 may protrude. Also the hub cover 20 is preferably provided with a plurality of slots 37 adjacent the clips 21 through which the chain grips may be passed into the openings 22.

The preferred embodiment of collar 25 shown in Figs. 2 and 3 may be applied by pressing inwardly on the collar. In this embodiment the collar may be removed by forcing a special tool between the beads 23 and 28 or by forcing a screw driver or tire changing tool between the bead 26 and the edge 27 of the rim.

In the modification disclosed in Fig. 4 the details of the collar 25 are exactly as disclosed in the first embodiment. However, in this form of the assembly the hub cover 120 may be more easily formed since its outer edge is extended inwardly in the general plane of the main surface of the hub cover so as to cause the edge bead 121 thereof to lie in the angle formed by the bottom wall 14 of the rim and the flange 12 of the disc wheel 10. In this form of the invention the edge of the hub cover 120 may be provided with a plurality of notches 122 adjacent the clips 21 so as to permit reception of the chain grips. As in the first modification the maximum diameter of the hub cover is preferably greater than the inner diameter of the bead 28 of the rim covering collar so that accidental displacement of the hub cover is prevented. However, in this form of the invention the bead 28 does not press against any portion of the hub cover so that a greater latitude of tolerances in forming the two members may be permitted at the expense of more likelihood of rattles developing due to weakening of the clips 21. To overcome this likelihood to some extent the maximum diameter of the hub cover 120 is preferably such as to cause tight engagement between the bead 121 and the bottom wall 14 of the rim.

Having illustrated and described the preferred embodiments of my present invention, it should be apparent to those skilled in the art that the same permits of various modifications in arrangement and detail. All such as come within the scope of the following claims are considered a part of my invention.

I claim:

1. A wheel assembly comprising a rim having a drop center tire well, said rim having its flanges provided with tire bead receiving offsets in its side walls and safety ridges forced upwardly at the inner edges of the bottom walls of the tire bead receiving offsets, thus providing slightly reentrant depressions on the outer surface of said rim, a disc wheel to which said rim is peripherally attached, said disc wheel having a plurality of chain grip openings therethrough adjacent its periphery, a hub cover having its peripheral edge approximately overlying the periphery of said disc wheel, a plurality of resilient clips fixed to said hub cover and adapted to be forced through said chain grip openings to retain said hub cover in position, and an outwardly flared collar overlying the outer surface of said rim from adjacent the periphery of said hub cover to adjacent the periphery of the rim and having a plurality of resilient tongues extending upwardly from adjacent its inner edge into the depression provided by the outer surface of one of said reentrant safety ridges, said tongues being resiliently engageable in said depression upon the application of pressure against said collar and being so formed as to force the edges of said collar against adjacent portions of said rim, the maximum diameter of said hub cover being greater than the inner diameter of said collar so that said collar tends to prevent accidental displacement and loss of said hub cover.

2. A wheel assembly comprising a rim having a drop center tire well, said rim having its flanges provided with tire bead receiving offsets in its side walls and safety ridges forced upwardly at the inner edges of the bottom walls of the tire bead receiving offsets, thus providing slightly reentrant depressions on the outer surface of the rim, a disc wheel to which said rim is peripherally attached, said disc wheel having a plurality of chain grip openings therethrough adjacent its periphery, a hub cover having its peripheral edge approximately overlying the periphery of said disc wheel, a plurality of resilient clips fixed to said hub cover and adapted to be forced through said chain grip openings to retain said hub cover in position, and an outwardly flared collar overlying the outer surface of said rim from adjacent the periphery of said hub cover to adjacent the periphery of the rim and having a plurality of resilient tongues extending upwardly from adjacent its inner edge into the depression provided by the outer surface of one of said reentrant safety ridges, said tongues being resiliently engageable in said depression upon the application of pressure against said collar and being so formed as to force the edges of said collar against adjacent portions of said rim, the outer edge of said hub cover being outwardly flared and adapted to engage the shoulder formed by the bottom and a side wall of the drop center portion of said rim, the maximum diameter of said hub cover being greater than the inner diameter of said collar, and the inner edge of said collar being adapted to thrust against the outer edge of said hub cover when said collar is in position whereby said collar tends to prevent rattling of said hub cover and accidental displacement and loss of said hub cover.

3. A wheel assembly comprising a rim having a drop center tire well, said rim having its flanges provided with tire bead receiving offsets in its side walls and safety ridges forced upwardly at the inner edges of the bottom walls of the tire bead receiving offsets, thus providing slightly reentrant depressions on the outer surface of the rim, a disc wheel to which said rim is peripherally attached, said disc wheel having a plurality of chain grip openings therethrough adjacent its periphery, a hub cover having its peripheral edge approximately overlying the periphery of said disc wheeel, a plurality of resilient clips fixed to said hub cover and adapted to be forced through said chain grip openings to retain said hub cover in position, an outwardly flared collar overlying the outer surface of said rim from adjacent the periphery of said hub cover to adjacent the periphery of the rim, and an upwardly and inwardly extending locking ring attached to the inner edge of said collar and comprising a plurality of resilient tongues extending into the depression provided by the outer surface of one of said reentrant safety ridges, said tongues being resiliently engageable in said depression upon the application of pressure against said collar and being so formed as to force the edges of said collar against adjacent portions of said rim, the maximum diameter of said hub cover being greater than the inner diameter of said collar so that said collar tends to prevent accidental displacement and loss of said hub cover.

4. A wheel assembly comprising a rim having a drop center tire well, said rim having its flanges provided with tire bead receiving offsets in its side walls and safety ridges forced upwardly at the inner edges of the bottom walls of the tire bead receiving offsets, thus providing slightly reentrant depressions on the outer surface of the rim, a disc wheel to which said rim is peripherally attached, said disc wheel having a plurality of chain grip openings therethrough adjacent its periphery, a hub cover having its peripheral edge approximately overlying the periphery of said disc wheeel, a plurality of resilient clips fixed to said hub cover and adapted to be forced through said chain grip openings to retain said hub cover in position, an outwardly flared collar overlying the outer surface of said rim from adjacent the periphery of said hub cover to adjacent the periphery of the rim, and an upwardly and inwardly extending locking ring attached to the inner edge of said collar and comprising a plurality of resilient tongues extending into the depression provided by the outer surface of one of said reentrant safety ridges, said tongues being resiliently engageable in said depression upon the application of pressure against said collar and being so formed as to force the edges of said collar against adjacent portions of said rim, the outer edge of said hub cover being outwardly flared and adapted to engage the shoulder formed by the bottom and a side wall of the drop center portion of said rim, the maximum diameter of said hub cover being greater than the inner diameter of said collar, and the inner edge of said collar being adapted to thrust against the outer edge of said hub cover when said collar is in position whereby said collar tends to prevent rattling of said hub cover and accidental displacement and loss of said hub cover.

WILLIAM A. MULHERN.